Jan. 23, 1923.

L. M. CLEMENT ET AL.
CONTROL OF ELECTRIC CIRCUITS.
FILED DEC. 2, 1920.

1,443,007.

2 SHEETS—SHEET 1.

Inventors:
Lewis M. Clement.
Arthur W. Kishpaugh
by W. E. Beatty, Att'y.

Jan. 23, 1923.
L. M. CLEMENT ET AL.
CONTROL OF ELECTRIC CIRCUITS.
FILED DEC. 2, 1920.
1,443,007.
2 SHEETS—SHEET 2.
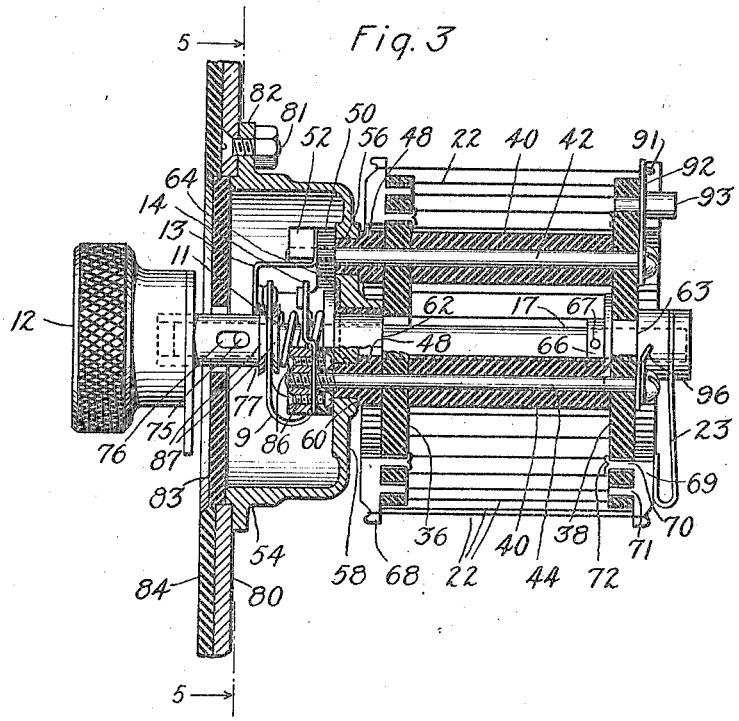
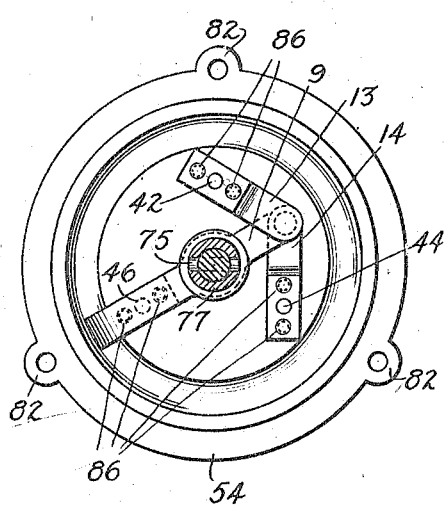
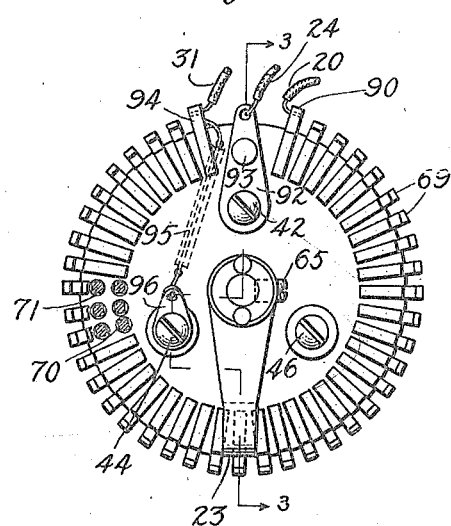
Inventors:
Lewis M. Clement.
Arthur W. Kishpaugh.
by W. E. Beatty. Att'y.

Patented Jan. 23, 1923.

1,443,007

UNITED STATES PATENT OFFICE.

LEWIS M. CLEMENT AND ARTHUR W. KISHPAUGH, OF EAST ORANGE, NEW JERSEY, ASSIGNORS TO WESTERN ELECTRIC COMPANY, INCORPORATED, OF NEW YORK, N. Y., A CORPORATION OF NEW YORK.

CONTROL OF ELECTRIC CIRCUITS.

Application filed December 2, 1920. Serial No. 427,838.

*To all whom it may concern:*

Be it known that we, LEWIS M. CLEMENT and ARTHUR W. KISHPAUGH, citizens of the United States, residing at East Orange, in the county of Essex and State of New Jersey, have invented certain new and useful Improvements in Control of Electric Circuits, of which the following is a full, clear, concise, and exact description.

This invention relates to the control of electrical conditions in one or more circuits.

One object of the invention is to provide means whereby an operator can conveniently manipulate a circuit controller, for example a variable impedance, with one hand for varying an electrical condition of the circuit such as the amount of current in the circuit and can simultaneously, with the same hand also manipulate means, for example a switch, for rendering an indicating means effective to indicate the electrical condition of the circuit.

A further object is to provide means whereby a plurality of circuits having individual circuit controllers, may be controlled in the manner described above and whereby the controllers and the indicating means are so related that the selection by the operator of any controller for operation, results in the selection of the proper means for rendering the indicating means effective to indicate the effect of the operation of that controller.

A further object of the invention is to provide such a control means for a plurality of circuits, wherein the indicating means is a common means for indicating the electrical conditions of each of the circuits.

Figure 1:
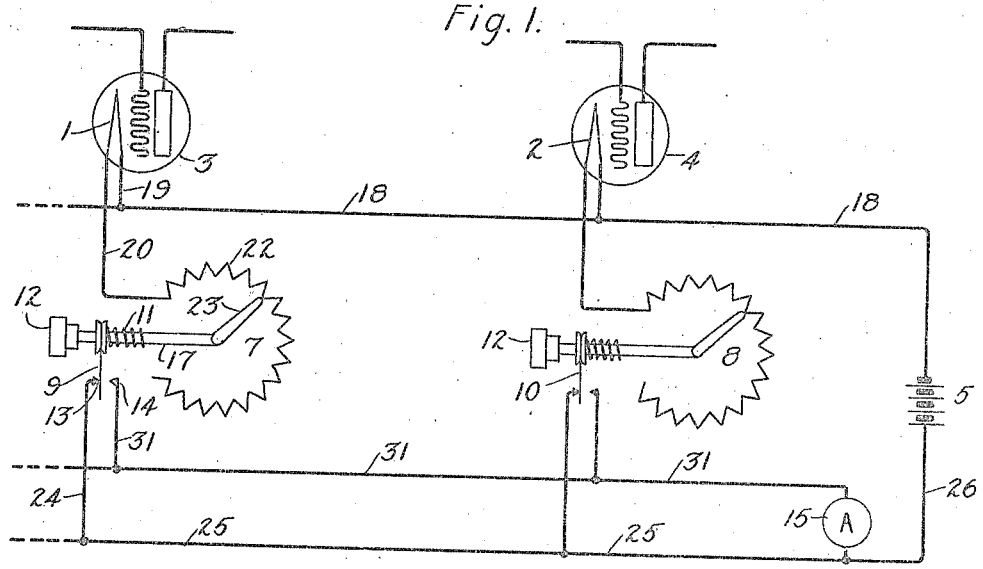
Figure 2:
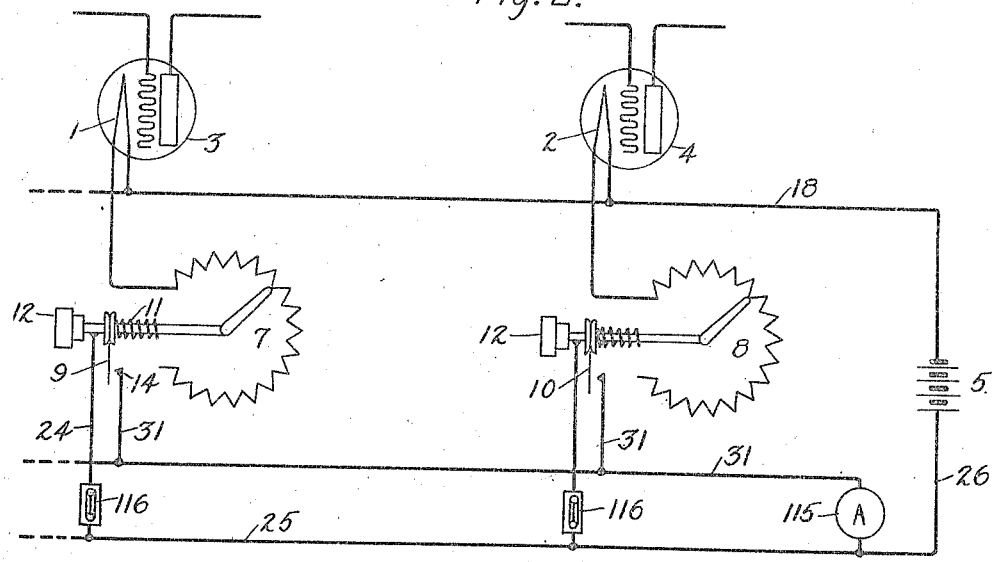

In the accompanying drawings, Fig. 1 shows one embodiment of the invention diagrammatically, Figs. 3 to 5 showing the structure of a combined rheostat and switch employed in the system of Fig. 1. Fig. 2 is a diagram of a slightly modified system employing a slightly modified form of combined switch and rheostat.

In a system shown in the drawing, the circuits to be controlled are heating circuits for filaments 1 and 2 of vacuum tubes 3 and 4 respectively. These circuits are fed in parallel from source 5 and include individual control rheostats 7 and 8 and individual movable switch contacts 9 and 10. The contact 9 is biased by a spring 11 to normally close the circuit of the filament 1 and the rheostat 7 through a contact 13, and is adapted to be pressed by handle 12 of the rheostat 7 to break the contact at 13 and close the circuit of the filament 1 and the rheostat 7 through a contact 14 and an ammeter 15 whenever the current through the filament 1 and the rheostat 7 is to be measured by the ammeter 15. The handle 12 is connected to shaft 17 of the rheostat 7 so that the handle is slidable axially along the shaft but is non-rotatable with reference to the shaft, a preferred form of combined switch and rheostat embodying this feature being described below.

Referring to Fig. 1, a normal circuit for the filament 1 is from the source 5, through lead 18, lead 19, filament 1, lead 20, resistance element 22 of the rheostat 7, contact arm 23 of the rheostat, shaft 17 of the rheostat, the movable contact 9, the contact 13, lead 24, lead 25 and lead 26 back to the battery 5.

Whenever it is desired to measure the current flowing through a filament 1, the handle 12 of the rheostat is pressed toward the right and moves contact 9 out of engagement with contact 13, thereby breaking the circuit through the contact 13, and into engagement with the contact 14 thereby closing a circuit which may be traced from the battery 5, through elements 18, 19, 1, 20, 22 and 23 to a contact 9 and thence through the contact 14, lead 31, the ammeter 15 and the lead 26 back to the battery 5.

The contact 10 may be operated to control the circuit of filament 2 in the manner in which the contact 9 is operated to control the circuit of the filament 1. The combined rheostat and switch 8, 10 is similar in all respects to the combined rheostat and switch 7, 9.

Thus, when the operator wishes to vary the current through these filaments, he can conveniently use one and the same hand to turn the appropriate rheostat handle for varying the resistance of the circuit of that filament, and simultaneously press the handle for closing the circuit of the ammeter 15 for measuring the current which is being varied.

The structure of the combined rheostat and switch is shown in Figs. 3 to 5. Referring especially to those figures, the frame of the rheostat is made up of the two end discs 36, 38, of insulating material, spaced apart by three tubes, 40, of insulating material, only two of which appear in the drawing. Threaded rods 42, 44 and 46 pass longitudinally through the bores of the tubes to hold the tubes clamped between the end discs 36, 38. The rods 42, 44 and 46 also extend through tubular insulating elements 48 positioned against the outer side of disc 36 and through the insulating blocks 50 and the internally threaded metallic blocks 52, the blocks 52 serving as nuts for clamping the elements 36, 38, 40 and 48 together on the rods. The ends of elements 48 nearer the blocks 50 have a reduced external diameter, and the rheostat is supported from a switch casing 54 by having these reduced portions of the tubular element 48 pass through apertures 56 in the end wall 58 of the switch casing, the end wall of the casing being clamped between blocks 50 and shoulder 60 on the tubular elements 48.

Metallic bushings 62 and 63 in the end wall 58 and the disc 38 respectively, form bearings for the rheostat shaft 17 which carries the rheostat contact wiper or arm 23. The bushing 62 is insulated from the switch casing by insulation 64. The contact arm 23 is held in position on the shaft by set screw 65 (see Fig. 4), and this contact arm at one side of the disc 38 and a collar 66 fastened on the shaft 17 at the other side of the disc by set screw 67 prevent axial movement of the shaft.

The resistance element 22 of the rheostat is a continuous wire 22, looped back and forth over the hooked ends of metallic punchings 68 and 69 which are fastened edgewise in the disc 36 and 38 respectively. Preferably a drop of solder is placed at each point of contact between the wire and the element 69.

Each of the punchings 68 and 69 is flat and has two protruding tail pieces 70 and 71 on one edge, the piece 70 extending through the insulating disc 36 or 38, and being staked over as at 72, to hold the punching in position in the disc 36 or 38. The tail piece 71 holds the punching from turning laterally. The punchings 69 serve as the stationary contacts of the rheostat.

The rheostat handle 12 is attached to the rheostat shaft 17 by means of a pin and slot connection, the pin 75 being fixed in the shaft and playing in a slot 76 in a sleeve 77. The sleeve is rigidly connected to the handle and slidably mounted on the end of the shaft.

The switch casing 54 is supported from a metallic plate 80 by means of bolts 81 passing through lugs 82 on the casing. A disc 83 of insulating material is fastened to the casing by screws or the like (not shown), to close the end of the casing opposite the end wall 58. An insulating plate 84 covers the metallic plate 80.

The normally closed switch contact 13 is mounted between the insulating block 50 and the metallic block 52 on rod 42 and is electrically connected with rod 42 by the block 52 on that rod. The normally open switch contact 14 is similarly mounted between the blocks 50 and 52 on rod 44, and is in electrical connection with rod 44 by means of the block 52 on that rod. The movable switch contact 9 is a U-shaped strip, and has one end mounted between blocks 50 and 52 on rod 46. The blocks 50 and 52 are preferably clamped together by means of screws 86, which prevent the contact strips 9, 13 and 14 from turning about the rods 46, 42, and 44. In the free end of the U-shaped contact strip 9 is an aperture through which the rheostat shaft 17 passes loosely. A disc 87, of brass or the like, is placed at each side of the aperture, these discs having apertures through which shaft 17 passes loosely, and being fastened to the strip by any suitable means, (not shown). One of the discs 87 is urged against the sleeve 77 by the pressure of one end of the spring 11 on the other disc, the other end of the spring 11 bearing against the bushing 62. The shaft 17 is electrically connected with the contact 9 through the bushing 62, the spring 11 and the disc 87 against which the spring bears. The contact strips 9, 13 and 14 have their free ends in a line parallel to the rheostat shaft. Therefore, the spring 11 causes the movable contact 9 to normally engage contact 13, but the handle 12 may be pressed to compress spring 11 and thereby open the circuit through the filament and the rheostat at 9, 13 and close the circuit of the filament and the rheostat at 9, 14 at any time, and regardless of, and without interfering with, the position of the rheostat arm 23, and without interfering with any desired operation of the rheostat arm.

The leads 20, 24 and 31 which connect the combined switch and rheostat circuit, as shown in Fig. 1, are attached to the switch rheostat structure at the points indicated in Fig. 4. The lead 20 from the filament 1, is connected on terminal piece 90, which is a punching set edgewise in the disc 38 after the fashion in which the stationary contacts 69 of the rheostat are attached to the disc 38, the lead 20 being soldered in a hole 91 in the piece 90. The piece 90 is connected to one end of the resistance wire as shown in Fig. 1, the other end of the resistance wire being open, or unconnected. The lead 24, connected at one end to the battery through leads 25 and 26, is connected at its other end to a terminal plate 92, the plate being fastened on the disc 38 by means of the threaded rod 42 and being prevented from turning about rod 42 by means of the stud 93 passing through the plate 92 and into the disc 38. The stud 93 also serves to limit the rotation of the rheostat arm 23. The plate 92 is in electrical engagement with the rod 42. The lead 31, connected at one end to the ammeter 15, is connected at its other end to a terminal piece 94, similar to the terminal piece 90. The terminal piece 94 is not connected to the resistance wire 22, but is connected to the rod 44 by rod 95 and terminal plate 96.

Thus, the normal circuit through the combined rheostat and switch is from lead 20 and terminal piece 90, through resistance wire 22, rheostat arm 23, rheostat shaft 17, bushing 62, spring 11, disc 87 in contact therewith, movable switch contact 9, fixed switch contact 13, block 52 on rod 42, rod 42, and plate 92, to lead 24; and the circuit through the rheostat and switch when contact 13 is pressed into engagement with contact 14, is from lead 20 to the movable contact 9, as just described, and thence through the fixed contact 14, block 52 on rod 44, rod 44, plate 96, lead 95, and terminal piece 94, to lead 31.

Fig. 2 illustrates an embodiment of the invention in which the filament currents are indicated by a milli-voltmeter 115 adapted to measure the voltages across shunts 116, one of which is permanently connected in the lead 24 in series with the filament 1 and rheostat 7, and another of which is similarly connected with respect to the filament 2 and rheostat 8. The permanent electrical connection between the shunt and the rheostat shaft is made by connecting a lead (not shown) between the blocks 52 on rods 46 and 42 (Fig. 4), for instance, and the contact 13 can be omitted. Normally, the circuit from the milli-voltmeter is open. Pressure upon the handle 12 will cause the closing of the circuit of the milli-voltmeter 115 to indicate the current through the filament.

Certain features of the rheostat disclosed herein is the invention of Arthur Haddock, and are claimed in his application Serial No. 501,984, filed September 20, 1921, entitled Contact terminals, assigned to the assignee of this application.

What is claimed is:

1. A circuit, a measuring instrument for measuring an electrical condition of said circuit but normally ineffective to measure said electrical condition of said circuit, control means for gradually varying said electrical condition of said circuit, and means operable by said control means for rendering said instrument effective to measure said electrical condition of said circuit during the varying of said condition by said control means.

2. An electrical circuit, measuring means for indicating an electrical condition of said circuit, control means adapted to gradually vary said condition of said circuit, one of said means being normally ineffective to perform its stated function, and means for simultaneously rendering said one means effective to perform its stated function and operating the other of the two first-mentioned means.

3. An electrical circuit, measuring means for indicating an electrical condition of said circuit, control means adapted to gradually vary said condition of said circuit, one of said means being normally ineffective to perform its stated function, and bi-motional means for operating the other of the two first-mentioned means and rendering said one means effective to perform its stated function.

4. A circuit, a variable impedance adapted to vary the electrical condition of the circuit, normally ineffective measuring means adapted to indicate said condition and bi-motional means for varying said impedance by one motion and capable of rendering the measuring means effective by motion independent of the first-mentioned motion.

5. A circuit, a variable impedance adapted to vary the current in the circuit, normally ineffective means adapted to measure said current and bi-motional means for varying said impedance by one motion and capable of rendering the measuring means effective by motion independent of the first mentioned motion, regardless of, and without changing the position of said bi-motional means with reference to the first-mentioned motion.

6. A circuit, control means movable for controlling the electrical condition of said circuit, indicating means for indicating said electrical condition of said circuit but normally ineffective to indicate said electrical condition of said circuit, and means operable by the control means in any operative position of said control means without the control means performing any control operation on said circuit, to render the indicating means effective to indicate said electrical condition of said circuit.

7. A plurality of circuits, individual impedance varying means for controlling said circuits, a common measuring means for measuring the currents in the circuits but normally ineffective to measure said currents, and individual switches for said circuits, adapted to be operated to render the measuring means effective to measure said currents, said impedance varying means and said switches being so mechanically related that the selection of any one of said impedance varying means for operation results in the selection of the proper one of said switches to be operated to render the measuring means effective to measure the particular current varied by said one impedance varying means.

8. A plurality of circuits, common indicating means for indicating an electrical condition of said circuits but normally ineffective to indicate said electrical condition of said circuits, individual means for the circuits for rendering said indicating means effective to indicate said electrical condition of said circuits, and individual control means for said circuits for varying said electrical condition of said circuits, said individual means and said control means being so related that selection of any one of said control means for operation results in the selection of the proper one of said individual means to be operated to render the indicating means effective to indicate said electrical condition in the particular circuit controlled by said one control means.

9. A plurality of circuits, indicating means for indicating an electrical condition of said circuits but normally ineffective to indicate said electrical condition of said circuits, individual means for the circuits for rendering said indicating means effective to indicate said electrical condition of said circuits, and individual control means for said circuits for varying said electrical condition of said circuits, said individual means and said control means being so mechanically related that selection of any one of said control means for operation results in the selection of the proper one of said individual means to be operated to render the indicating means effective to indicate said electrical condition in the particular circuit controlled by said one control means.

10. A plurality of impedances, individual impedance varying means for the impedances, a common measuring instrument normally ineffective and adapted to measure the currents in the impedances, and switch means for rendering the instrument effective to measure the current in the impedances, each of the impedance varying means being adapted to operate the switch means.

11. A plurality of impedances, individual impedance varying means for the impedances, a common measuring instrument normally ineffective, adapted to indicate an electrical condition in the impedances, and switch means for rendering the instrument effective to indicate said electrical condition in said impedances, each of the impedance varying means being adapted to operate the switch means.

12. A plurality of impedances, individual impedance varying means movable to a plurality of operative positions for varying the impedances, a common measuring instrument for measuring the current in the impedances but normally ineffective to measure said currents, and individual switches for the impedances for rendering said instrument effective to measure said currents, said impedance varying means being so mechanically related to said switches that said switches may be operated by said impedance varying means in any of said operative positions of said impedance varying means without said impedance varying means varying said impedances, to render said measuring instrument effective to measure the particular current to be varied.

13. An electrical system comprising a plurality of translating devices, a common measuring instrument adapted to measure the currents in said devices and individual switches for said circuits, each switch being adapted to assume a number of positions to vary the current in the corresponding translating device, and being adapted to have another motion, independent of whatever position it may be in at a particular instant, for cutting in the measuring instrument to indicate the current in the corresponding translating device.

In witness whereof, we hereunto subscribe our names this 29th day of November A. D., 1920.

LEWIS M. CLEMENT.
ARTHUR W. KISHPAUGH.